(No Model.)
G. H. CORLISS.
Pump.
No. 235,743. Patented Dec. 21, 1880.
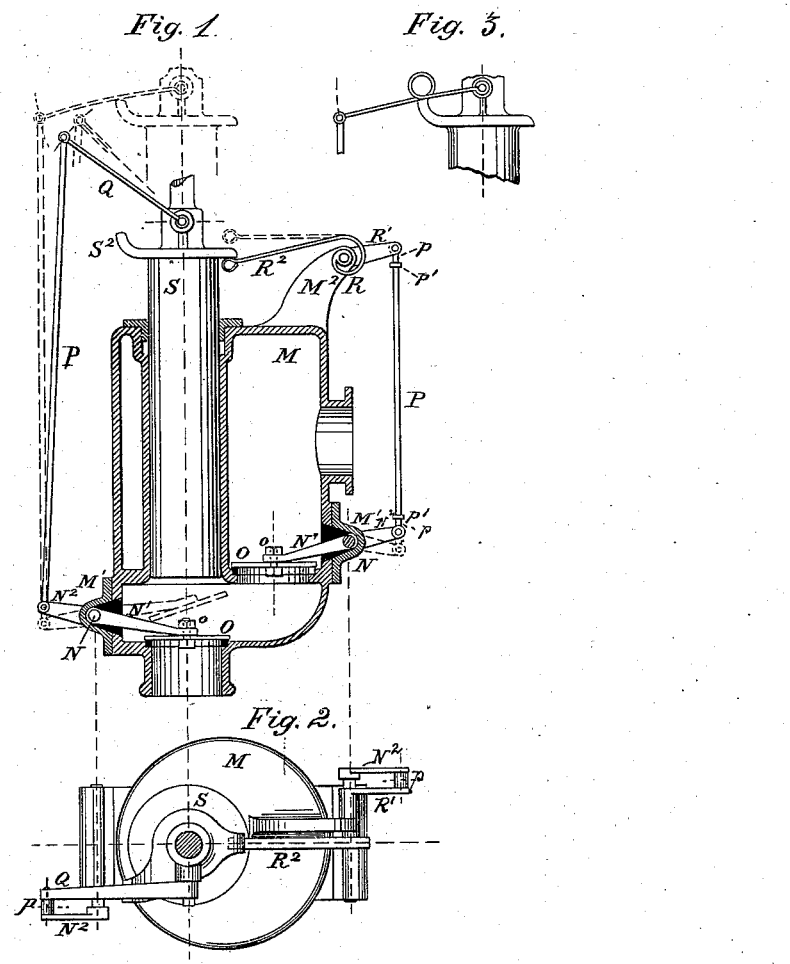

UNITED STATES PATENT OFFICE.

GEORGE H. CORLISS, OF PROVIDENCE, RHODE ISLAND.

PUMP.

SPECIFICATION forming part of Letters Patent No. 235,743, dated December 21, 1880.

Application filed June 14, 1880. (No model.)

*To all whom it may concern:*

Be it known that I, GEORGE H. CORLISS, a citizen of the United States, residing at Providence, in the county of Providence, in the State of Rhode Island, have invented certain new and useful Improvements relating to Pumps, of which the following is a specification.

The invention relates to the means for guiding and operating the valves. It is intended more particularly for large pumps. The valves are of a class which open by the lifting motion. They are partly self-acting and partly operated by mechanism.

The valves are preferably in the form of thin disks, and open by vertical, or nearly vertical, motion, and close upon seats of leather or other pliable material. They may be arranged in sets or series extending around the pump; but these details may be varied.

I will show and describe only two valves, mounted one to serve as the induction and the other as the eduction valve.

Each valve is connected by an arm to a rocking shaft. This shaft is mounted in a removable bonnet, which covers a hole in the casing of the pump sufficiently large to allow the valve to be inserted and removed. By taking off the bolts and removing the bonnet the shaft and valve may be removed with it. In case of derangement or fracture the bonnet and valve may be removed, and a new bonnet being ready, with the corresponding shaft, arm, and valve, the new may be substituted for the old, and the entire pumping machinery be ready for working again with only a few minutes delay. The shaft projects out through one of the ends of the bonnet, and carries an arm on the protruding end, which allows the attachment of a link from any suitable portion of the pumping machinery to aid in closing the valve, or in both opening and closing it. I employ a spring having an abutment moved by the machinery to urge the valve to its seat when it should shut, and to allow it to open when it should open.

My invention relieves the machine in great part from the concussions experienced when large pumps are worked rapidly. I ascribe the evil commonly observed to a back-flow of water and a sudden stoppage thereof. My invention tends to prevent any back-flow. It gives a strong force, urging each valve to its seat at the moment when the valve should close. It gives the force elastically, so that the motion of the water may be accommodated if the mechanism is not adjusted perfectly, and allowance may be made for any solid substance accidentally catching under the valve; and it entirely relieves the valves from any force holding them down during the main portion of the time while they should be open. It thus allows the valves to open widely and freely.

The accompanying drawings form a part of this specification, and represent what I consider the best means of carrying out the invention.

Figure 1 is a vertical section through one of the main pumps. The strong lines show the plunger in its lowest position. The dotted lines show the plunger in its highest position. Fig. 2 is a corresponding plan view. Fig. 3 represents a modification. It is an elevation, showing the upper part of the plunger and the adjacent parts, with the plunger in its elevated position.

Similar letters of reference indicate like parts in all the figures where they occur.

Referring to Figs. 1 to 3, inclusive, I will indicate the entire fixed work of a pump by the single letter M, certain parts being designated when necessary by additional marks $M'$, $M^2$, &c. The plunger is marked S. $M'$ are the removable bonnets, covering apertures sufficiently large to allow the introduction and removal of the valves. N N are shafts mounted in bearings in the bonnets $M'$ $M'$, and having rigidly-attached arms $N'$. Each arm $N'$ extends inward through an aperture in the casing M, and takes hold, by a bolt, $o$, of the disk-valve O. Another arm, $N^2$, is attached to the projecting end of each valve-shaft N.

To the arm $N^2$ is pivoted the hollow rod P, which leads upward to my mechanism, which, by the aid of this rod, aids the working of the valve. The rod P for the induction-valve connects at the top to the outer end of an elastic lever, Q, which is pivoted to the plunger S.

When the plunger is down and commences to ascend, the spring-lever Q is in the position shown by the strong lines in Fig. 1, and has no effect except to contribute by its weight to balance the valve; but when the plunger rises to near its highest position a stop, S², on the plunger S strikes the end of spring-lever Q and lifts thereon, as shown in dotted lines in Fig. 1. This lifting action pulls upward on the rod P and closes the valve. The spring-lever Q is therefore a spring tending to close the valve, but only acting intermittently. During a large portion of each stroke it is idle, but at or near the highest point of the plunger motion it exerts a strong force, urging the valve O to its seat. It follows that as the upward motion of the plunger decreases the valve is urged down with gradually-increasing force. The force should be sufficient, according to the flow of water and the rapidity with which the pump is worked, to urge the valve to its seat as soon as the plunger has actually stopped its upward motion and before it has commenced to descend. The eduction-valve is operated in a corresponding manner and by a slightly-different mechanism. The rod P' for this valve connects to the arm R' on the rock-shaft R, which latter is mounted to turn in bearings on brackets M². Another arm, R², fixed on the same shaft R, is made of steel or other elastic material, bent around the shaft so as to give sufficient elasticity, finally extending inward in the position represented. While the plunger S is in its highest position during the main portion of each stroke this mechanism produces no effect. It should be so constructed as to balance, or nearly balance, the valve. When the plunger descends to near its lowest point the flange on the plunger strikes the arm Q, depressing it, and it pulls upward on the connected rod P and urges the suction-valve to its seat.

I provide for adjusting the tension of the springs, or the force with which each shall act on its valve, by either changing the length of the rod P or altering the position of the abutment.

Modifications may be made in the details of this part of the invention by any good mechanic. The forms of the valves and the arrangement of the levers and springs may be varied indefinitely.

Fig. 3 shows a modification in the form of the lever, being formed in a closely-coiled helix, which allows it a very elastic action with strong force, but with only a moderate strain upon any portion of the metal.

With either or any form of parts the arms N² perform an important function in addition to those before described, by indicating to the eye the working of the valve and showing the extent and character of the motion, and showing when any obstruction shall prevent its properly closing.

I claim as my invention—

1. The combination of a pump-valve, a spring, and a movable abutment for the spring, moved by the working of the pump, adapted to serve as and for the purposes herein specified.

2. In a pump, the valves O, connected to the rocking shafts N by arms N', and having arms N², adapted to not only indicate to the eye the workings of the valve, but also to allow the application of mechanism to aid the operating, substantially as herein specified.

3. In a pump, the removable bonnet M', forming the covering to the aperture for the attachment and removal of the valve, and also the bearing for the shaft N, in combination with such shaft, having arms N' and N², with the valve O, with operating means P and their connections, substantially as herein specified.

4. The rocking shaft N, with its arms N' N², valve O, operating means P, and their attachments, worked by the motion of the pump, combined and arranged as specified, so as to perform the triple functions of indicating to the eye the action of the valve, contributing to balance the weight of the valve, and promoting the motion thereof by power applied thereto, substantially as herein specified.

5. The adjusting means P $p$, in combination with the self-acting valve O, and with means, N N' N², for communicating force thereto, all arranged and adapted to serve substantially as herein specified.

In testimony whereof I have hereunto set my hand, at Providence, Rhode Island, this 9th day of June, 1880, in the presence of two subscribing witnesses.

GEO. H. CORLISS.

Witnesses:
EDGAR PENNEY,
ED. W. RAYNSFORD.